(No Model.)
C. G. MOLIN.
VELOCIPEDE.
No. 434,605. Patented Aug. 19, 1890.
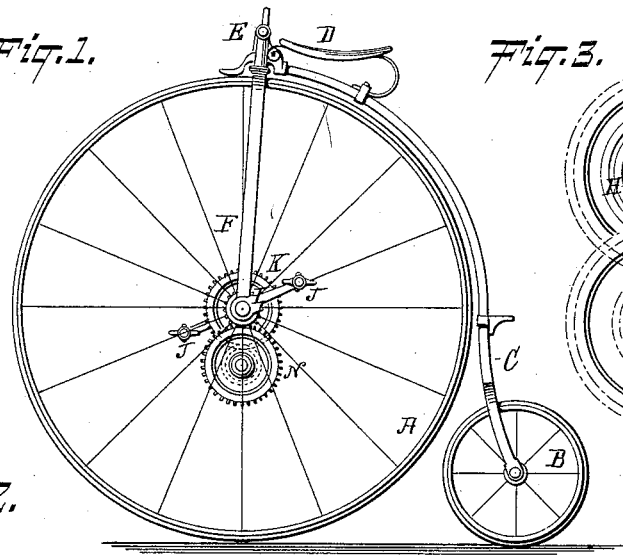
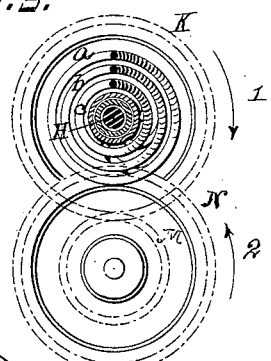
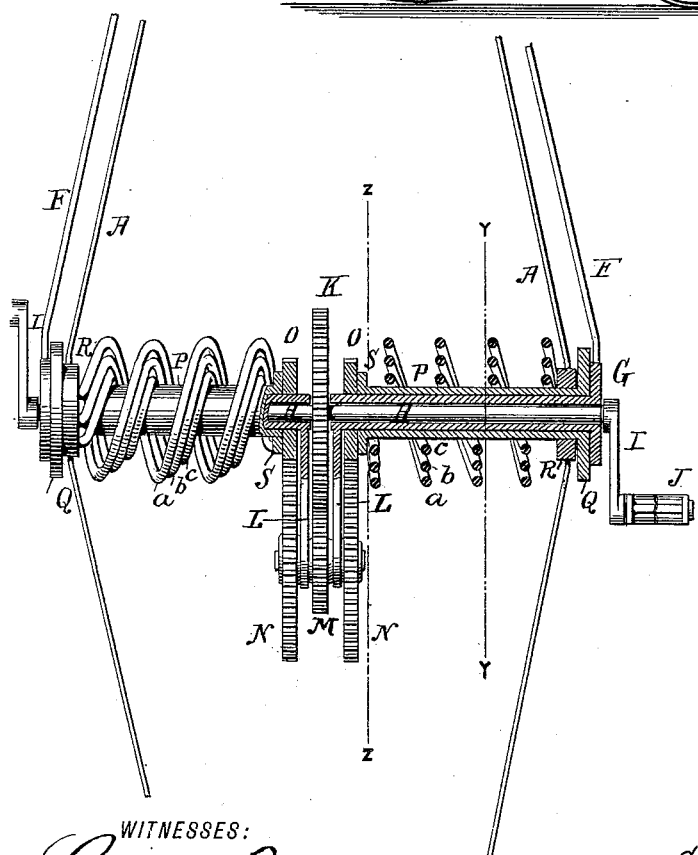
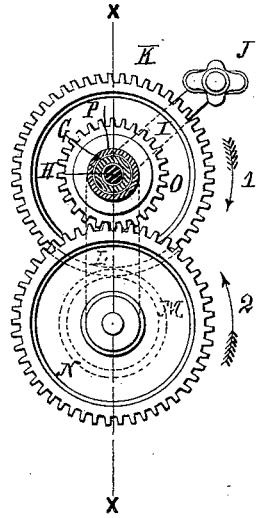
WITNESSES:
Gustave Dieterich
M. Bosch
INVENTOR
Charles Gunnar Molin
BY Park Benjamin
his ATTORNEY.

UNITED STATES PATENT OFFICE.

CHARLES GUNNAR MOLIN, OF BROOKLYN, NEW YORK.

VELOCIPEDE.

SPECIFICATION forming part of Letters Patent No. 434,605, dated August 19, 1890.

Application filed February 17, 1890. Serial No. 340,802. (No model.)

*To all whom it may concern:*

Be it known that I, CHARLES GUNNAR MO-LIN, of Brooklyn, Kings county, New York, have invented a new and useful Improvement in Power Accumulating and Equalizing Mechanisms for Vehicles, of which the following is a specification.

My invention relates to a device for accumulating and equalizing power applied to the driving-wheel of a vehicle, and more particularly to that of a bicycle or velocipede.

My invention consists in the combination, in a vehicle, of an elastic body interposed between the said wheel and a mechanism for applying torsion to said body, the said body then operating to accumulate and equalize the applied power, and to apply the same through its torque or twisting movement to the wheel.

My invention further consists in the combinations of mechanism, all as hereinafter more particularly set forth.

In the accompanying drawings, Figure 1 is a side elevation of a bicycle wherewith my invention is combined. Fig. 2 is a partial sectional view of my power accumulating and equalizing mechanism on the line X X of Fig. 4. Fig. 3 is a sectional view on the line Y Y of Fig. 1, and Fig. 4 is a sectional view on the line Z Z of Fig. 1.

Similar letters of reference indicate like parts.

A is the main or driving wheel, and B is the trailing wheel of a bicycle.

C is the reach or backbone, and D the saddle supported thereon. The trailing wheel B is journaled in the end of the reach in the usual way.

E is the tiller, secured to the upper end of a bifurcated support F, between the arms of which support F the axle of wheel A passes. The mode of combination of the support F and reach C is such that the said support may be rotated in said reach by proper manipulation of the tiller, and the construction of these may be any that is now well known and in common use. Secured to the arms of the support F are flanged sleeves G, through which passes the axle-shaft H, to the extremities of which shaft are secured the cranks I, carrying the treadles J. Fast on the shaft H, and between the ends of the sleeves G G, is a gear K. Extending downward, respectively, from the sleeves G G are arms L L, between which arms is journaled a pinion M, which engages with the gear K. On the shaft of pinion M, and outside of said arms L L, are gears N N, which gears engage with pinions O O, which are fast upon the inner extremities of sleeves P P. The sleeves P P inclose the sleeves G, and each sleeve P P has at its outer end a flange Q, which bears against the flange of the sleeve H.

R R are the hubs of the wheel A, and said hubs freely rotate upon the sleeves P P. Secured at one end to an inner flange S of each sleeve P P and at their outer ends to the hubs R R of the wheel are spiral springs *a b c*, which are wound around the sleeves P P.

I here show three springs surrounding each sleeve P P; but I may diminish or increase the number at will.

The operation of the invention is as follows: The feet of the rider operating the treadles J in the usual way rotate the shaft H, and hence the gear K, in the direction of the arrow 1, Figs. 3 and 4. The pinion M (and hence the gears N N) is thus caused to turn in the opposite direction or in that of the arrow 2, Figs. 3 and 4. The gears N N, engaging with the pinions O O, then rotate the pinions O O, and hence the sleeves P P, in the same direction as the arrow 1. Power then is transmitted through the springs to the wheel-hubs R R, so that the wheel is caused to turn in the direction of the arrow 1—that is, in direction to cause the vehicle to move forwardly; but it will be observed that the train of gearing K M N O is a multiplying one, so that if, for example, the pinion M is caused to make two revolutions by one rotation of the gear K and the pinion O two revolutions by one rotation of the gear N it follows that the pinion O makes four revolutions for every single revolution of the treadles, on the shaft of which gear K is fast. Necessarily this would call for the application of greatly-increased power at the treadles if the number of rotations of the wheel in a given time were thus augmented; but owing to the inertia of the vehicle only a part of the power exerted is at once communicated to the wheel, the rest being expended upon the springs to wind them up. The springs thus act simply as a reservoir, so to speak, for the energy applied to the treadles, which thus constantly tends to rotate the wheel in a forward direction. To put it in another way, the rotative effect of the crank upon its shaft is converted into a rotary effect upon the wheel. Of course I do not mean to affirm in any wise the fallacies that power can be gained by any interposed mechanical appliance or that the use of the crank causes really any loss of power. I do maintain, however, that when power is applied to the treadles by the feet it is necessarily not applied with any such uniformity or continuity as it would be by the regularly-moving piston of a steam-engine, and that if this power be applied directly to the driving-axle every intermittence or variation in the power will necessarily reappear in intermittent or variable motion of the wheel; but with my device after the first expenditure of power necessary to wind up the springs irregularity in application of the power afterward at the treadles becomes practically immaterial, the energy being accumulated in the springs and given off constantly and uniformly with the result of driving the vehicle at a higher rate of speed than otherwise would be obtained.

I claim—

1. The combination, in a vehicle, of a wheel, an elastic body, and a means of applying torsion to said elastic body, the said body being connected to the face of said wheel, having its longitudinal axis in prolongation of the wheel-axis and operating by its torque to rotate said wheel.

2. The combination, in a vehicle, of a wheel, an elastic body, and a means of applying torsion to one end of said body, the said body being connected at its other end to the face of said wheel, having its longitudinal axis in prolongation of the wheel-axis and operating by its torque to rotate said wheel.

3. The combination, in a vehicle, of a wheel, an axle on which said wheel is free to turn, means of rotating said axle, transmitting mechanism communicating with said axle and said wheel and constructed to transmit motion from one to the other, and an elastic body interposed between said gearing and said wheel the said elastic body operating to receive and accumulate power transmitted from said gearing and to convey the same to said wheel to cause rotation thereof.

4. The combination, in a vehicle, of a wheel, an axle on which said wheel is free to turn, means of rotating said axle, multiplying gearing between said axle and said wheel and transmitting motion from one to the other, so that for one rotation of said axle the wheel may rotate a number of times, and an elastic body interposed between said gearing and said wheel, the said elastic body operating to receive and accumulate power transmitted from said gearing and to convey the same to said wheel to cause rotation thereof.

5. The combination, in a vehicle, of the wheel A, axle H, and means of rotating said axle, the sleeve G, surrounding said axle and rigidly secured to the body of said vehicle, the sleeve P, surrounding said sleeve G, gearing between said axle and said sleeve G and transmitting motion from said axle to said wheel, the wheel-hub R, loosely received upon said sleeve P, and a coiled spring, as $a$, surrounding said sleeve P and connected at its opposite ends, respectively, to said sleeve and said wheel-hub.

6. The combination, in a velocipede, of the wheel A, axle H, and means for rotating said axle, the sleeve G, surrounding said axle, the stay or support F, secured to the outer end of said sleeve, the depending bracket L on said sleeve G, gears M N, journaled in said bracket, gear K on axle H, engaging with gear M, the sleeve P, surrounding said sleeve G and carrying the gear O, engaging with gear K, the wheel-hub R, loosely received upon said sleeve P, and a coiled spring, as $a$, surrounding said sleeve P and connected at its opposite ends, respectively, to said sleeve and said wheel-hub.

CHARLES GUNNAR MOLIN.

Witnesses:
SAMUEL PICKFOROL,
M. BOSCH.